(12) United States Patent
Reunamaki et al.

(10) Patent No.: US 9,301,268 B2
(45) Date of Patent: Mar. 29, 2016

(54) DEVICE SYNCHRONIZATION

(71) Applicant: Nokia Technologies Oy, Espoo (FI)

(72) Inventors: Jukka Pekka Reunamaki, Tampere (FI); Arto Tapio Palin, Viiala (FI); Matti Sakari Hämäläinen, Lempäälä (FI); Niko Tapani Kiukkonen, Veikkola (FI); Janne Marin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 84 days.

(21) Appl. No.: 14/076,123

(22) Filed: Nov. 8, 2013

(65) Prior Publication Data
US 2015/0131645 A1    May 14, 2015

(51) Int. Cl.
*H04L 1/00* (2006.01)
*H04W 56/00* (2009.01)
*H04W 4/00* (2009.01)

(52) U.S. Cl.
CPC .............. *H04W 56/00* (2013.01); *H04W 4/008* (2013.01)

(58) Field of Classification Search
CPC ....... H04J 3/0638; H04J 3/0639; H04J 3/064; H04J 3/0641; H04J 3/0642; H04W 56/00; H04W 56/01; H04W 56/02; H04W 56/03
USPC ................................. 370/350, 503
See application file for complete search history.

(56) References Cited

U.S. PATENT DOCUMENTS 7,675,943 B2    3/2010 Mosig
2009/0225172 A1    9/2009 Tsuchiya
2012/0300944 A1*    11/2012 Spittle .............................. 381/17

FOREIGN PATENT DOCUMENTS

CN            201388232 Y    1/2010

OTHER PUBLICATIONS

Pertila et al., "Closed-Form Self-Localization of Asynchronous Microphone Arrays", Joint Workshop on Hands-free Speech Communication and Microphone Arrays, May 30-Jun. 1, 2011, 6 pages.
Sachar et al., "Microphone Position and Gain Calibration for a Large-Aperture Microphone Array", IEEE Transactions on Speech and Audio Processing, vol. 13, Issue 1, Jan. 2005, pp. 42-52.

* cited by examiner

*Primary Examiner* — Dady Chery
(74) *Attorney, Agent, or Firm* — Mintz Levin Cohn Ferris Glovsky and Popeo, P.C.

(57) ABSTRACT

Methods and apparatus, including computer program products, are provided for device synchronization. In one aspect there is provided a method. The method may include establishing, at a first wireless device, a clock to be shared with at least a second wireless device; and sending, by the first wireless device over a short-range wireless link, a command to at least the second wireless device, the command indicating an operation to be performed by at least the second wireless device at a time defined by the clock. Related apparatus, systems, methods, and articles are also described.

15 Claims, 10 Drawing Sheets

DEVICE SYNCHRONIZATION

FIELD

The subject matter described herein relates to wireless communications.

BACKGROUND

Master timing among devices can be derived from a master device's native clock. Slave device(s) may keep an estimate of the master device's native clock by adding a timing offset to the slave's native clock. This offset may be updated each time a packet is received from the master. In this way, master timing is not affected by time drifts at slave device(s).

SUMMARY

Methods and apparatus, including computer program products, are provided for device synchronization.

In one aspect there is provided a method. The method may include establishing, at a first wireless device, a clock to be shared with at least a second wireless device; and sending, by the first wireless device over a short-range wireless link, a command to at least the second wireless device, the command indicating an operation to be performed by at least the second wireless device at a time defined by the clock.

In some variations, one or more of the features disclosed herein including the following features can optionally be included in any feasible combination. The operation may include presentation of an image by a display at the second wireless device. The first wireless device may detect an image presented by a display at the second wireless device, the image being presented at the time indicated by the command. The first wireless device may select the second wireless device for communications, when the first wireless device detects the image presented by the display at the second wireless device. The first wireless device may forward, in response to the selecting, data for presentation at the second wireless device. The operation may include playing, at the time, audio content at the second wireless device. An audio delay may be determined between the first wireless device and the second wireless device by at least determining a difference between the time when the audio is played by the second wireless device and another time when the audio is received by the first wireless device. The clock may include a master clock. At the first wireless device, the master clock may represent a native Bluetooth clock. At the second wireless device, the master clock may represent an estimate of the master clock determined based on an offset added to a clock local to the second wireless device. The time defined by the clock may represent the time being synchronized to the clock.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
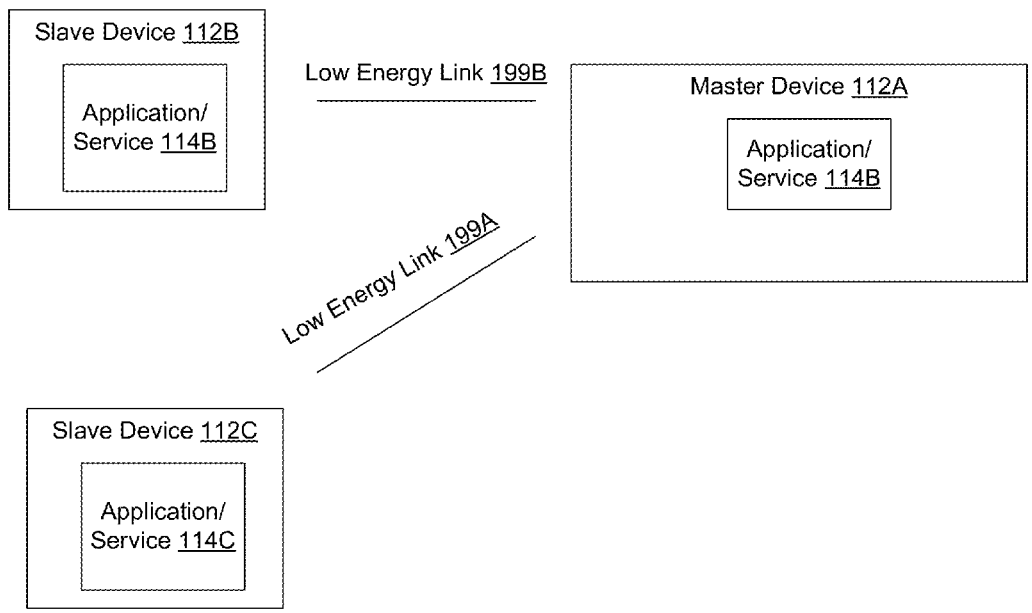
FIG. 1 depicts an example of a system implementing device synchronization, in accordance with some exemplary embodiments.

Like labels are used to refer to same or similar items in the drawings.

DETAILED DESCRIPTION

Performing synchronized actions in the two or more wireless devices in a network including a local area network may present challenges. For example, when a device commands a peer device to perform an operation, such as emitting audio signal, capture sound, capture an image, and the like, there can be relatively long and/or relatively unpredictable latencies associated with processing at the devices (for example, software-related stack delays, radio-related stack delays, and the like). This unpredictability may make it difficult to synchronize operations among the devices.

In some example embodiments, the subject matter described herein may relate to defining a common clock for a plurality of devices. This common clock structure may provide a time base to synchronize operations among the devices. For example, devices having short-range radio transceivers, such as Bluetooth, Bluetooth Low Energy, and/or any other short-range radio access technology, may be synchronized with a master network clock (or time), so that a command issued by a first wireless device can be executed by other devices at a certain time (or clock cycle) defined by the network clock.

In some example embodiments, the subject matter disclosed herein may also relate to enabling so-called "easy access" among devices to allow the devices to share content and/or resources.

FIG. 1 depicts an example of a system 100 including wireless devices 112A-C, in accordance with some example embodiments. In the example of FIG. 1, wireless device 112A is referred to as a master, and devices 112B-C are referred to as slaves. The term "master" may be used to merely refer to a device that provides a synchronization reference to slaves. Depending on the device initiating a connection or a role switch request, other devices 112B-C may serve as a master, and device 112A may serve as a slave.

In some example embodiments, master wireless device 112A may couple to slave wireless devices 112B-C via short-range radio links, such as Bluetooth, Bluetooth Low Energy, Wi-Fi, or the like. For example, wireless device 112A may comprise user equipment, such as a smartphone, coupling via short-range radio transceivers to wireless devices 112B-C to form a local area network, such as a Bluetooth piconet, although other types of networks may be formed as well.

In some example embodiments, master wireless device 112A and one or more slave wireless devices 112B-C may synchronize under a master network clock (also referred to herein as network time or, in the case of a piconet, piconet time). When synchronized, master wireless device 112A may issue a certain command requesting an operation to be performed at a certain time by one or more of slave wireless devices 112B-C. For example, master wireless device 112A may send a command to a slave wireless device 112B to perform a first operation, such as play an audio tone, display an image, and/or perform any other operation, at a certain, future time value. This time value may be relative to the master network clock. When that first time value occurs, slave device 112B may then execute the operation. In addition or alternatively, master wireless device 112A may instruct slave wireless device 112C to perform a second operation at another time (for example, at the time value or any other time as well). As such, the operations performed by devices 112A-C are predictable with respect to the master network clock shared by the devices 112A-C.

Although the previous example describes a master sending a command, a slave may send a command to a master or another slave as well.

Figure 2:
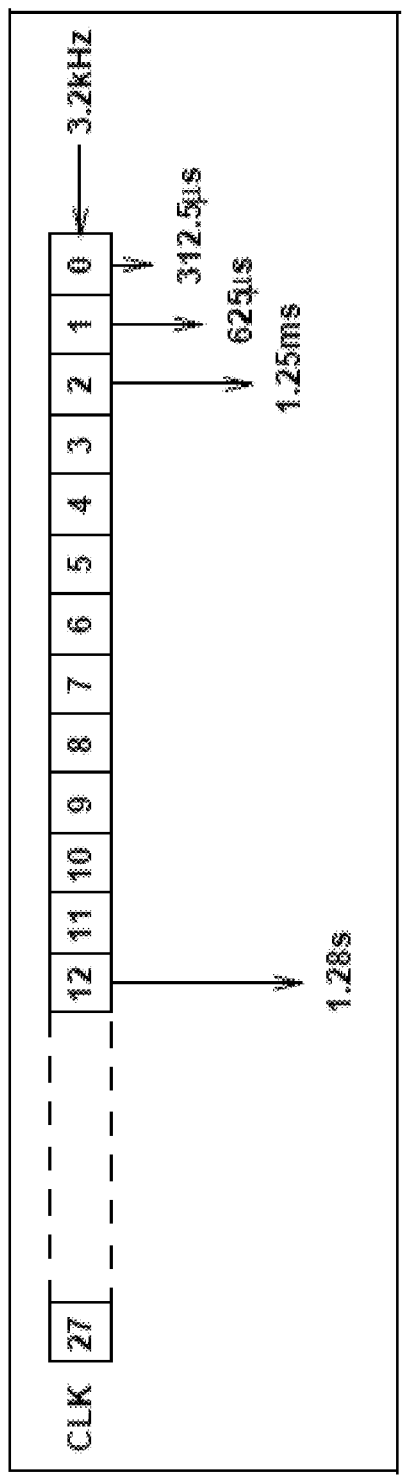
FIG. 2 depicts an example of a clock.

FIG. 2 depicts an example of a clock. When devices 112A-C include Bluetooth radio access technology, the devices 112A-C may also have a native clock derived from a free running system clock. For synchronization with other devices, timing offsets (also referred to as clock offsets or, more simply, offsets) can added to a device's native clock to provide a master network clock (or piconetwork time in the case of a piconet). A device can derive the master network clock from a master device's native clock. For example, a slave device may maintain an estimate of the master device's native Bluetooth clock (which can thus serve as a master network clock) by adding a timing offset to the slave's native clock. This offset may be updated each time a packet is received from the master. In this way, the master clock at a slave device may be relative to a master and thus not substantially affected by time drifts in the slave device.

In some example embodiments, devices 112A-C may be configured to read a piconet clock in order to determine a master clock using a host controller interface (HCI) command, such as HCI_Read_Clock. When that is the case, the slave device may provide parameters to HCI_Read_Clock command, which would return a piconet clock value. Any connection handle having a connection to a wanted master can be used. The read piconet value may be used directly, although the clock offset and native clock is the value needed that can be obtained as noted.

Figure 3:
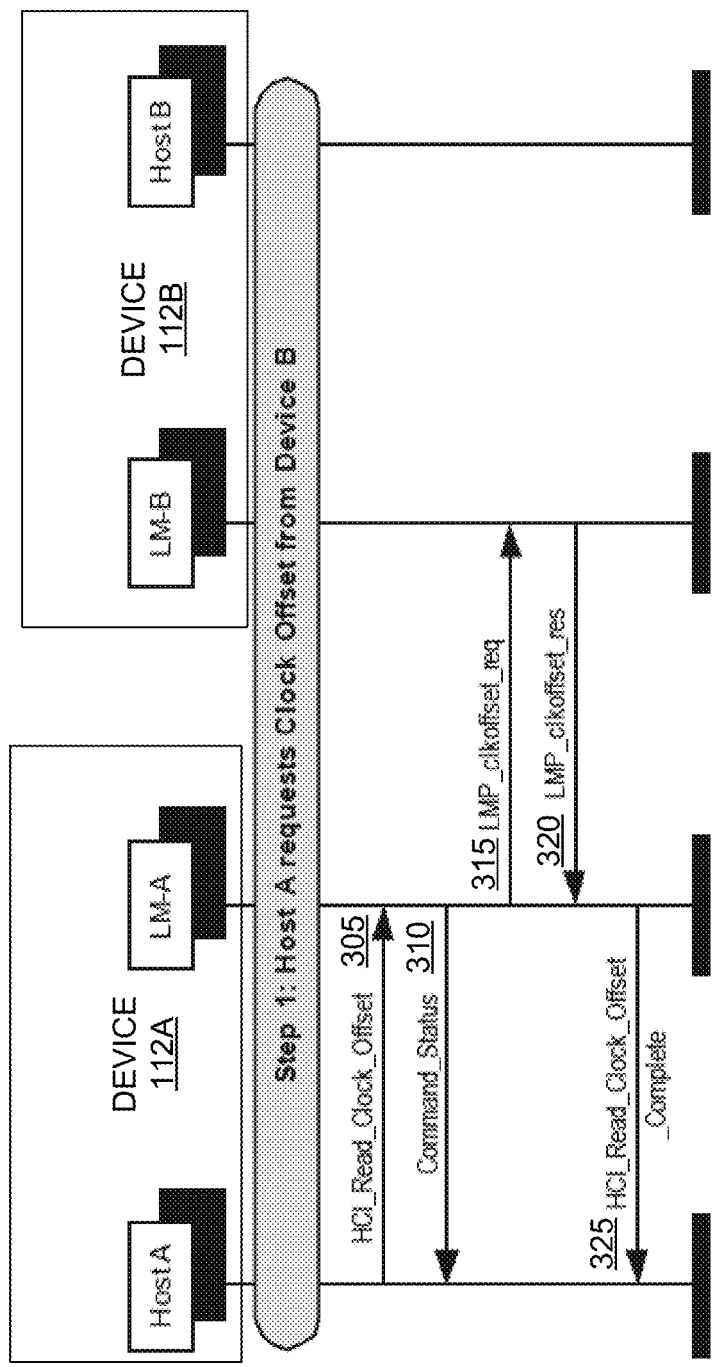
FIG. 3 depicts an example of a process for reading clock offsets.

FIG. 3 depicts an example of a process 300 in which piconet clock are read, in accordance with some example embodiments.

In the example of FIG. 3, one of the devices acting as a master, such a wireless device 112A, may send, at 305 to a link manager (LM) at device 112A. The link manager may acknowledge with a command status at 310 and may send at 315 a link management protocol clock offset request (LMP_clockoffset_req) to a slave device 112B (or link manger therein). The slave device 112B may respond at 320 to master wireless device 112A with a clock offset value being used by the slave wireless device 112B. The link manager at master wireless device 112A may provide at 325 the clock offset value to a host at master wireless device 112A. In this way, the devices 112A-C can each read or otherwise obtain the clock offsets being used at each of the devices 112A-C. When master wireless device 112A knows the clock offsets being used by slave wireless devices 112B-C, master wireless device 112A may send commands to slave wireless devices 112B and/or C to perform certain commands at certain times. As devices 112A-C are in synchronization under a master network clock, master wireless device 112A can predict when an operation will occur at slave wireless device 112B-C.

Although FIG. 3 describes reading clock offsets from other devices, devices can also read clock values from other devices using for example a host control interface command, such as HCI_Read_Clock. When this is the case, the HCI_Read_Clock command may be used to read an estimate of the value of the piconet Bluetooth clock at a device from a Basic Rate/Enhanced Data Rate (BR/EDR) controller, which is the estimate of the master (piconet) clock.

In some example embodiments, master device 112A may read its own clock (which serves as the master network clock or piconet time), and slave devices 112B-C may read the master network clock/piconet time (which is the same or similar to the master device's clock adjusted by the clock offset for each slave device). This master network clock/piconet time value is then used to synchronize the operations performed by devices 112A-C.

In some example embodiments, devices 112A-C may read clock information (for example, master network time and the like) without host or application level connections by, for example, while reading the service discovery protocol (SDP) record of a discoverable device. The clock value (when something happens) can be communicated over some other network than the network, which is using the clock values as a network clock and this clock value may be used to synchronize some other network actions, such as a beaconing/scanning activity in the network.

The time that is used to synchronize actions may represent a so-called "absolute" time that is the same in both ends. If device A gives a time as "12345" for a certain event to occur at device B, device B may use this time directly and compare the time "12345" to device B's own clock estimate. To illustrate further, device B may receive time "12345" from device A, and then device B may read its own clock estimate of "12340." In this example, device B knows that in 5 clock cycles, an action will be performed as directed by device A.

Referring again to FIGS. 1 and 2, master device 112A may instruct slave device 112B to perform an operation at, for example, clock (CLK) 1 and instruct slave device 112C to perform the same or different operation at clock (CLK) 1 or any other clock time, in accordance with some example embodiments. Moreover, the operation and/or the clock time may be predefined. For example, the command sent by the master device over the short-range link may explicitly include the requested operation and/or the time, or the command may instead implicitly indicate a predetermined operation and/or a predetermined time (for example, a single bit command can be used to indicate a predetermined operation at a predetermined time).

In some example embodiments, the synchronized operation(s) may comprise audio playback to allow determination of acoustic delay between devices. For example, master device 112A may want to know acoustic delay associated with the distance between devices 112A-B to compensate the audio for such delays and/or whatever reason.

Figure 4:
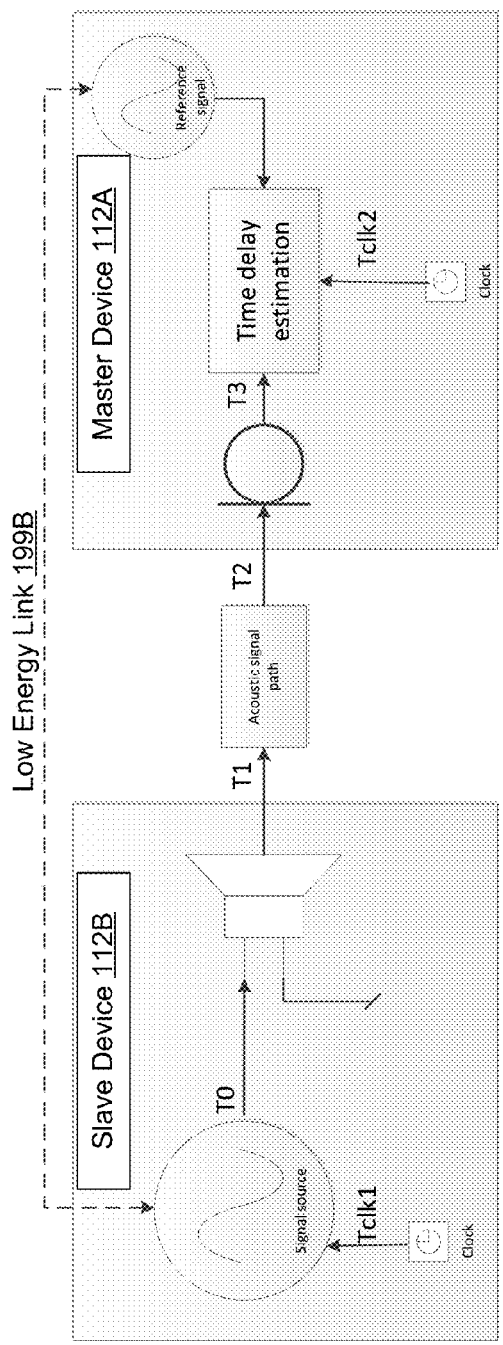
FIG. 4 depicts an example of a system configured to measure acoustic delay, in accordance with some exemplary embodiments.

FIG. 4 depicts an example system 400 including master device 112A coupled via short-range link 199B to slave device 112B. The acoustic delay ($\Delta T = T2 - T1$) can be used to calculate distance between devices and the like. In the example of FIG. 4, master device 112A may request via link 199B that slave device 112B perform an operation at a certain time defined by the master clock, such as a certain clock time defined with respect to for example the master clock of FIG. 2. The operation, in the example of FIG. 4, may be emitting an audio tone at a certain piconet time, such as 0x00002A23, which is depicted as time T1 at FIG. 4. Because master device 112A and slave device 112B are synchronized to a common master clock, master device 112A can determine the acoustic signal delay between devices 112A-B by measuring when the acoustic signal is received at a speaker of device 112A (labeled time, T2) and adjusting for other delays (for example, radio, software, and so forth) at master device 112A. These other delays are taken into account at FIG. 4 at T3.

Rather than have the slaves emit audio that is then detected by the master, the master may emit an audio tone, which can then detected by the slaves to determine acoustic delay between devices.

Another way is that Slave device 112B and Slave device 112C report exact time T1 to Master device 112A, where the slaved devices' own microphone can be for example used to detect T1 if there is for example some uncertainly when the audio exactly emitted compared to time request by master device 112A. For example, audio may be emitted by a given device at a Bluetooth clock time value (for example, 0x00002A23), and slave 112B measures with its own microphone when the sound is actually sent (for example, T1) and reports possible delays between wanted time and actual time T1.

In some example embodiments, the synchronized operation may comprise having one or more of slave devices 112B-C record a position, such as a geolocation, at a defined master network clock/piconet time and then report those values back to master device 112A. When devices have motion sensing, the displacement of the device may also be monitored so that a device can update position information only when the devices has been moved sufficiently as triggered by motion sensing.

Figure 5:
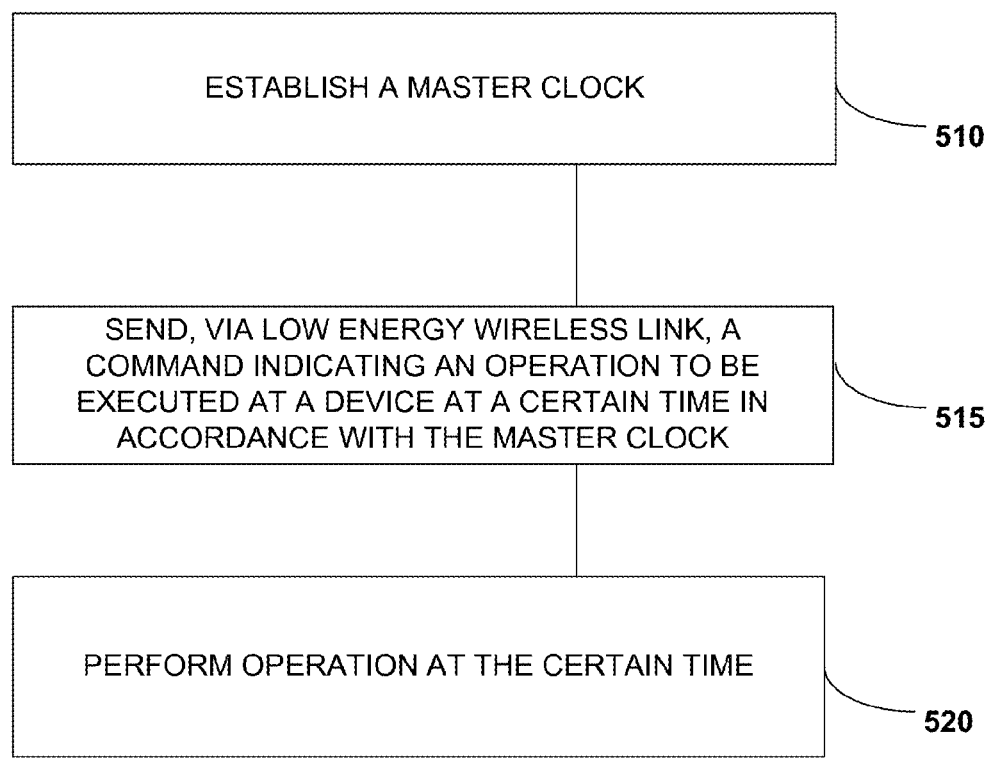
FIG. 5 depicts an example of a process for device synchronization, in accordance with some exemplary embodiments.

FIG. 5 depicts an example of a process for device synchronization, in accordance with some example embodiments. The description of FIG. 5 also refers to FIGS. 1 and 2.

At 510, master wireless device 112A may establish a master clock to be shared among slave devices 112B-C, in accordance with some example embodiments. For example, master wireless device 112A and slave device 112B-C may establish a network clock (or piconet time) among devices coupled by short-range links, such as Bluetooth and the like. The master device 112A may use its own native clock as the master clock, while slaves 112B-C may, as noted above, add offsets to the native device's clock to obtain the slave's version of the master clock.

At 515, master wireless device 112A may send over the short-range wireless link, such as Bluetooth and the like, a command to at least one of the slave wireless devices 112B-C. This command may indicating an operation, such as play audio, display an image, and the like, to be performed by at least at least one of the slave wireless devices 112B-C at a certain time in the future. Moreover, this certain time may be defined based on the master clock established at 510. For example, the certain time may be defined as specific clock time, such as clock within a Bluetooth master clock pattern as described above with respect to FIG. 2.

At 520, at least one of the slave wireless devices 112B-C performs the command, in accordance with some example embodiments. For example, the command may instruct slave device 112B to play an audio tone, present an image on a display, and the like, at a certain time, such as clock (CLK) 12 as depicted at FIG. 2. When the piconet clock at slave device 112B indicates clock (CLK) 12, slave device 112B performs the operation. In some example embodiments, the slave device may send to master device 112A an acknowledgement confirming receipt of the command at 515. Additionally or alternatively, slave device may send to master device 112A an acknowledgement confirming completion of the operation at 520.

In some example embodiments, synchronized operation may, as noted, comprise an image being presented at a certain time on the displays of one or more slave devices. The master device's camera or other image sensor may capture, at the certain time, the image being displayed by the slave(s). In some example embodiments, the image display and capture process may be used to indicate compatibility with a certain feature. For example, the feature may be a so-called "easy access" media or resource sharing capability at the master device and the slave device. The following description relates to this "easy access" media or resource sharing capability.

Figure 6:
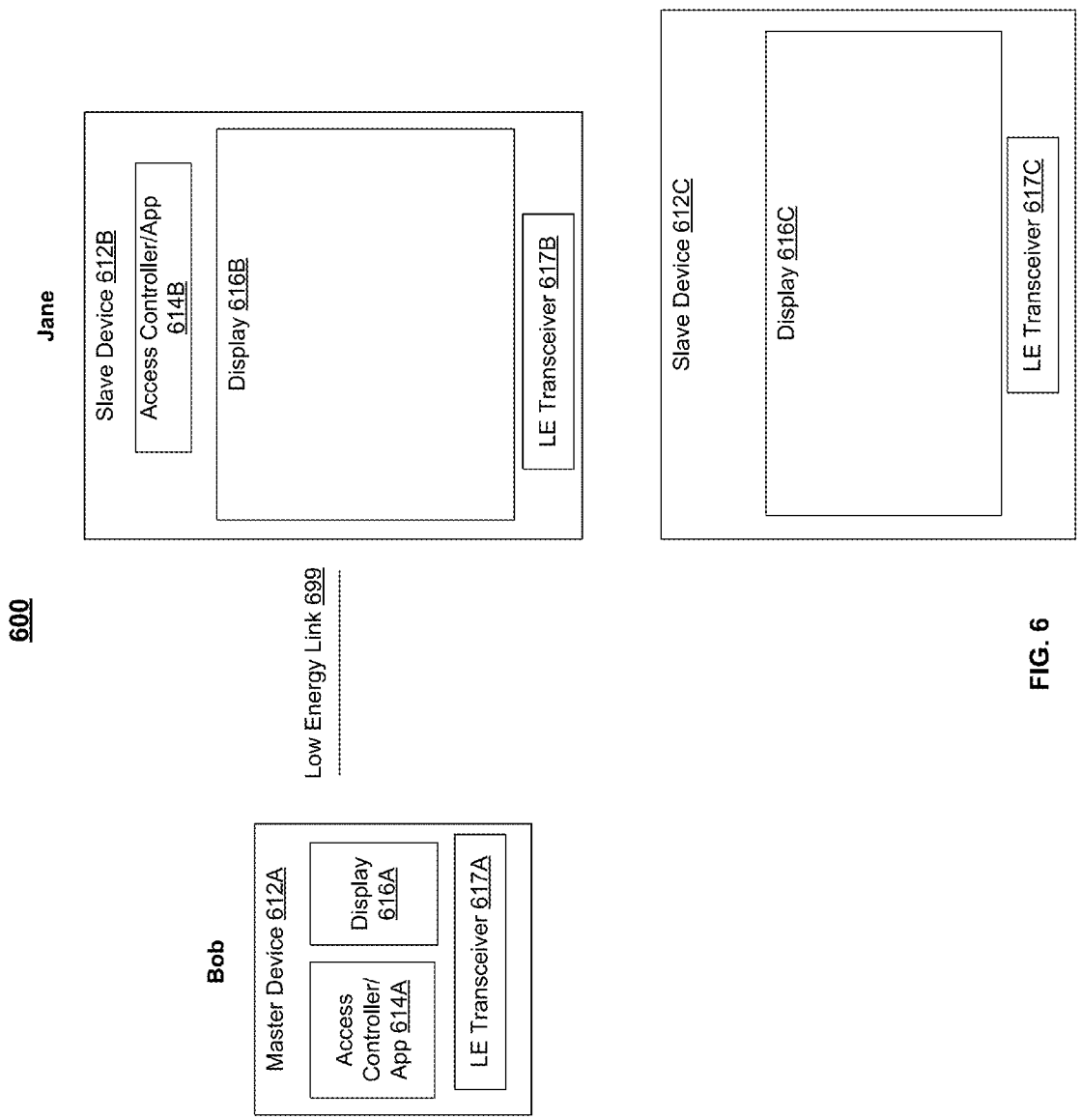
FIG. 6 depicts another example of a system implementing device synchronization and an operation enabling so-called "easy access" in accordance with some exemplary embodiments.

FIG. 6 depicts an example of a system 600 including devices 612A-C, each of which includes a short-range transceiver 617A-C, in accordance with some example embodiments. The short-range transceivers may be implemented as a Bluetooth radio, a Bluetooth Low Energy, a Wi-Fi radio, and/or any other short-range radio access technology.

Device 612A (labeled master device) may be implemented as a smartphone, a user equipment, and/or any other device. Device 612A may also include a user interface including a display 616A and an access controller, such as application 614A. In some example embodiments, application 614A is an easy access application configured to enable device 612A to provide or share media and/or other resources with other devices having a compatible easy access application. In the example of FIG. 6, device 612B (labeled slave device) includes an access controller, such as application 614B, but device 612C does not. Devices 612B-C may be implemented as a television, a music player, a media device, a tablet, a user equipment, a smartphone, and/or any other device. Devices 612B-C may also include user interfaces, such as displays 616B-C.

The following provides an example use case for the easy access application disclosed herein. For example, Bob may be using wireless device 612A, and may want to show and share content, such as video, images, and the like, on device 612A with Jane who is using device 612B. Rather than use display 616A on device 612A, Bob would rather use a larger display 616B available at Jane's device 612B. In some example embodiments, Jane's device 612B is a television including an access controller/application 614B, although Jane's device may be another type of device as well. The applications 614A-B may provide easy access connectivity and sharing capabilities among devices 612A-B (which include access controllers/applications 614A-B).

Bob's wireless device 612A may, in some example embodiments, discover and/or detect one or more other devices, such as devices 612B-C. For example, Bob's wireless device 612A may include a short-range radio transceiver and discover and/or detect other short-range radio transceivers at devices 612B-C. Next, Bob's wireless device 612A may synchronize with the discovered device(s), such as devices 612B-C. In some example embodiments, the synchronization may be in accordance with process 500, so a network clock or piconet time is established, although other forms of synchronization may be established as well.

When synchronization is established, Bob's wireless device 612A may, in some example embodiments, send via the short-range link a command requesting that Jane's wireless device 612B present on display 616B an identifiable pattern at a certain time in accordance with the synchronization provided by, for example, network clock or piconet time. However, device 612C may not present the identifiable pattern at a certain time because device 612C does not include the easy access capability provided by, for example, an access controller/application as in devices 612A-B.

Because devices 612A-B are in synchronization and include access controllers/applications 614A-B, Bob's wireless device 612A may detect an identifiable pattern, such as an image. For example, Bob's wireless device 612A may include a camera (or other type of image detector) to detect, at the certain time, the identifiable image pattern presented at display 616B of Jane's device 612B. Although this pattern may be detectable by humans, this pattern may, in some implementations, not be detectable by a user (for example, the pattern presented as an image at display 616B may be presented in one or two frames per second so, although detectable by a machine, not detectable by a human due to human perceptual limitations with respect to frame rate).

When the pattern is detected by Bob's wireless device 612A, wireless device 612A recognizes that wireless devices 612A has an access application/controller 614A and the corresponding easy access functionality to facilitate sharing and the like. The devices 612A-B may then establish (or complete the establishment of) connections via short-range links including application (and/or host)-level connections between applications 614A and 614B. In some example embodiments, an indication may be provided to Jane and/or Bob to indicate easy access compatibility as well. For example, devices 612A and/or device 612B may indicate compatibility by presenting an image (for example, box encircling the display 616A or 616B), a sound, and/or the like to indicate to Bob the easy access functionality provided by access controller/applications 614A and 614B. Devices 612A-B may then proceed to share resources by for example allowing Bob's device 612A to stream a video to Jane's display 616B via the short-range link. While Bob's wireless device 612A is within range of Jane's wireless device 612B, Bob's wireless device 612A can forward media to Jane's wireless device 612B and display 616B. From Bob's perspective, Bob shared media with Jane by launching an application 614A to share the media, pointing the wireless device 612A towards display 616B at Jane's wireless device 612B, viewing an indication of success/compatibility at display 616B (for example, a box encircling display 616B or other indication), and finally coupling to Jane's wireless device 612B to view media streamed from Bob's wireless device 612A to display 616B at Jane's wireless device 612B.

Figure 7:
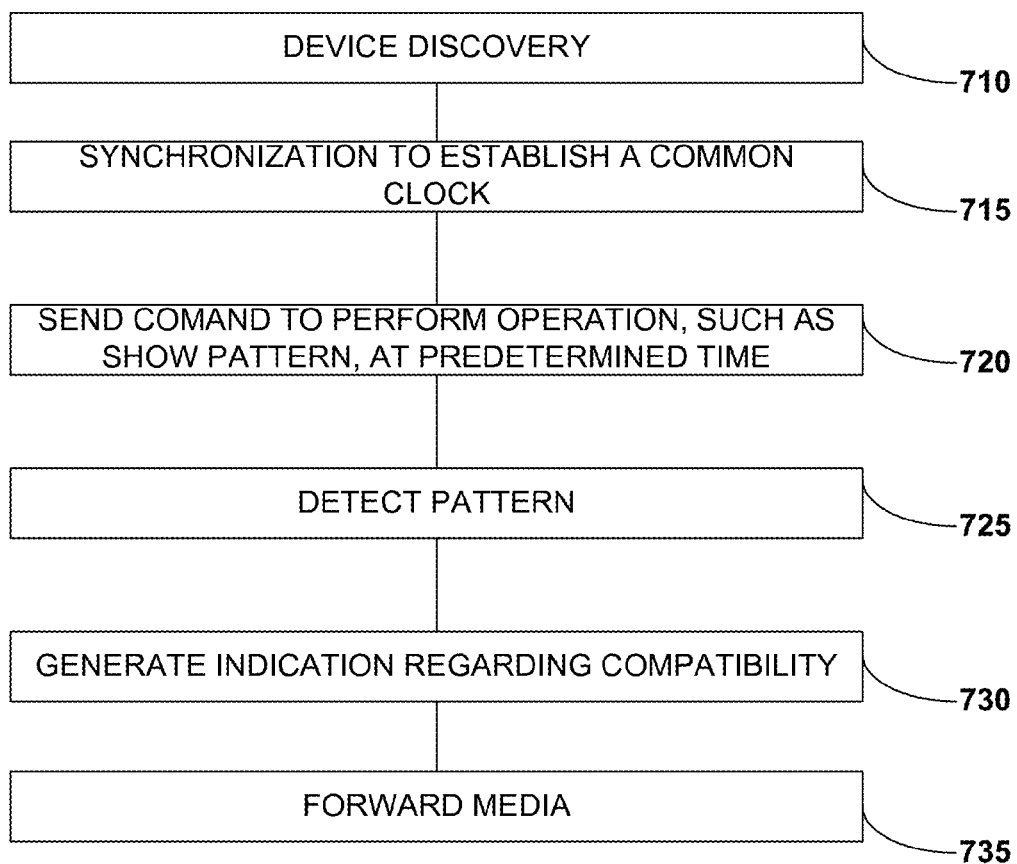
FIG. 7 depicts an example of a process for easy access, in accordance with some exemplary embodiments.

FIG. 7 depicts an example process for facilitating access between devices, in accordance with some example embodiments. The description of process 700 also refers to FIG. 6.

At 710, a device may discover one or more other devices, in accordance with some example embodiments. For example, device 612A may discover one or more other devices 612B-C by scanning for other devices having local connectivity bearers, such as short-range bearers including Bluetooth, Bluetooth Low Energy, Wi-Fi, and the like. This discovery may be stored and be performed as, for example, a background task at device 612A. In the case of Bluetooth, the discovery may be performed in accordance with a Bluetooth page-and-response protocol. When device 612A detects a device, such as device 612B or 612C, device 612A may proceed to establish connectivity between device 612A and the detected device(s) via short-range links. This connectivity may include short-range radio bearers, application level connectivity, and/or the like.

At 715, synchronization may, in some example embodiments, occur between devices 612A-612B to establish a common, network clock (for example, piconet in the case of a Bluetooth piconet). The synchronization may be performed in accordance with process 500 described above, although other synchronization processes may be used as well. In addition to reading master clock and offset information as noted above, synchronization among devices may be derived in other ways, such as via beacons or other messages found in Bluetooth, Bluetooth Low Energy, Wi-Fi, and the like.

Figure 8A:
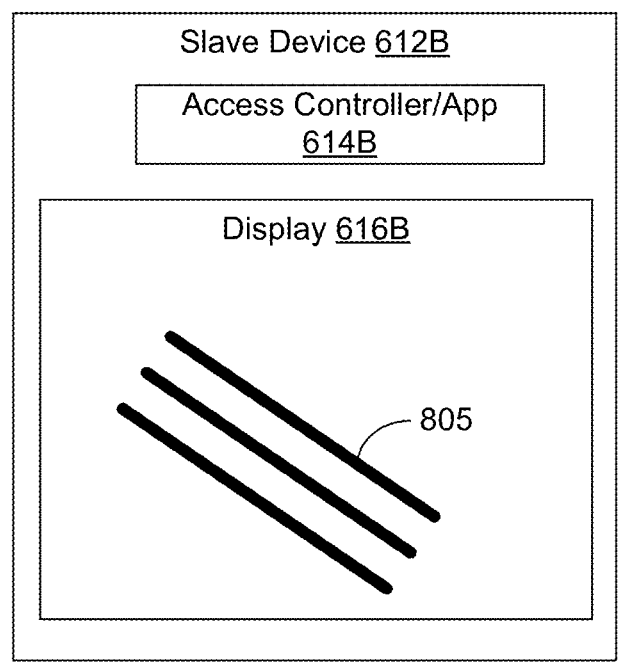
FIG. 8A depicts an example of an image presented at a certain time based on the device synchronization, in accordance with some exemplary embodiments.

At 720, the synchronization may, in some example embodiments, enable device 612A to send a command to device 612B and/or 612C at a predetermined time. For example, device 612A may send to devices 612B and/or 612C a command to request display of a predetermined image at a certain time. This time may be relative to the common network clock established at 715. Device 612B being synchronized to device 612A and having application 614B, displays the predetermined image at a predetermined time, such as clock time 4 (for example, CLK 4 at FIG. 2) to enable detection by a camera or image detector at device 612A. FIG. 8A depicts an example of the predetermined image presented at clock time 4. Referring again to FIG. 7, device 612B may detect the command and present the image but device 612C (which does not include an easy access controller/application) does not display the predetermined image.

As device 612A is synchronized with device 612B, device 612A may have its camera (or image detector) generally pointed in the direction of display 616B and, consequently, may, in some example embodiments, detect, at 725, the predetermined image (for example, pattern) at display 616B at a predetermined time. Referring to the previous example, device 612A may detect the image depicted at FIG. 8A at clock time 4. For example, device 612A's camera (or image detector) may capture an image (for example, pixels) for the predetermined image presented at display 616B, and this capture may be performed during the predetermined time (or just before and after). In any case, a processor at the device 112A may then process the captured image (or pixels) to detect whether the predetermined image was in the image. A template may scan the captured image for possible matches, although other image detection techniques may be used as well. At 725, device 612A may, in some example embodiments, wait for a trigger event indicating that easy access should proceed. For example, a selection at a user interface at device 612A may initiate the easy access command and the subsequent image capture of the image presented at display 616B. In addition or alternatively, an acceleration sensor or a camera button may initiate the easy access command and the subsequent image capture of the image presented at display 616B. Device 612A may also include sensors and/or inertial sensors to detect whether the camera is in a position in which the camera at device 612A can capture an image presented at display 616B.

In some example embodiments, the displayed predetermined image 805 at device 612B may be selected to enhance detection by other devices. For example, the predetermined image 805 may include areas of high contrast areas that are easier to detect. Moreover, the predetermined image 805 may have varying size to facilitate capture at different distances, angles, and the like. In some example embodiments, device 612A may estimate the distance to device 612B (for example, using a received signal strength indicator and the like) and command device 612B to present a certain sized image 805 based on the determined distance.

Figure 8B:
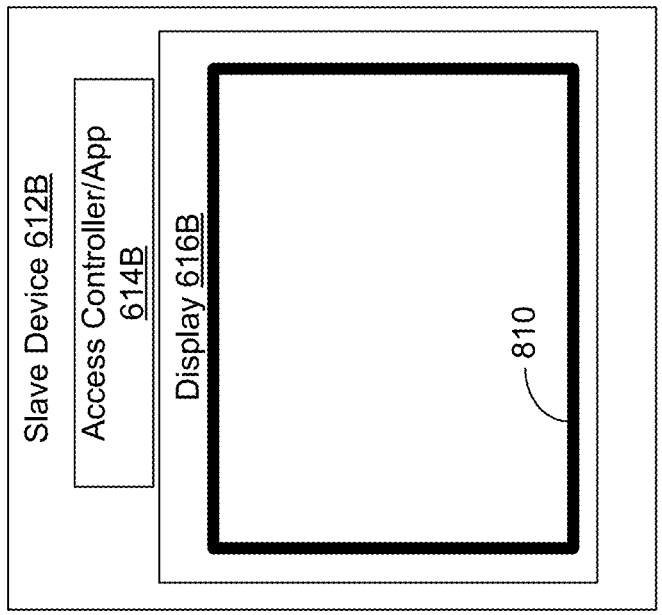
FIG. 8B depicts an example of an indication presented at devices to indicate compatibility and/or the success of the easy, in accordance with some exemplary embodiments.
Figure 8B:
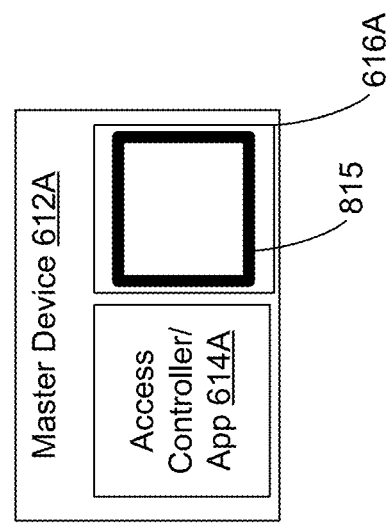

When device 612A detects the predetermined image 805 at the predetermined time defined by the network clock or synchronization established at 715, device 612A may, in some example embodiments, generate an indication to be presented at device 612A and/or 612B. This indication may alert a user that the devices 612A-B are compatible with respect to the "easy" access application 614A-B, and that the easy access has been successful. Referring to FIG. 8B, the indication at device 612A may be a visual indication 815 at the user interface or display 616A of device 612A, and/or a visual indication 810 at the user interface or display 616B of device 612B. The indications may take other forms including audible, haptic, and so forth.

In some example embodiments, the device taking the image, such as device 612A, may provide the camera frame rate as a parameter to the display at slave device 612B, and/or the display at slave device 612B may provide the screen refresh rate and the offset to the piconet clock as a parameter to the device 612A (for example, 15 frames per second, 24 microseconds, and the like). By doing this, the devices 612A and 612B may be able to better align the time instance(s), when the image is displayed on screen to the time instance(s) when the device 612A is taking the picture(s) of the display 616B. This may be implemented by starting the sharing application 614A; the sharing application 614A initiating a scan for Bluetooth devices; and the sharing application sending a command to the device(s) 612B and the like to show pairing data on their displays. The device 612A including sharing application 614A may then start taking pictures of the display 616B, record a time difference between when device 612A detects the display 616B to be changing/blinking/refreshing/presenting an image and the Bluetooth clock for two consecutive screen changes. As such, there is information on the device 612A when it can detect a certain operation on display 616B (for example, display blinking and the like) and compare that with the Bluetooth network clock instances. By informing this to the display 616B/device 612B, the two devices 612A and 612B may time the operation, such as code blinking and the like, to be visible for a minimal time on the screen (which may address the issue of different camera image capturing and display refresh rates).

At 735, device 612A may forward media to device 612B, so that the media can be shared at device 612B. For example, media, such as an image, video, and the like, at device 612A may be streamed to the display 612B to allow sharing of the content and, in this example, display 616B. In some example embodiments, access controller/applications 614A-B may also provide configuration information to facilitate the sharing between the devices 612A-B.

In some example embodiments, device 612A may be implemented as a smartphone or other user equipment having a plurality of radio access technologies including short-range radio transceivers, such as Bluetooth, Bluetooth Low Energy, Wi-Fi, and/or any other radio access technology. The device 612A may attempt discovery of one or more other devices, such as device 112B. For example, device 612B may be implemented as a television including application 614B providing so-called "easy access" via for example process 700 to other devices. Devices 612A-B may also become aware of the easy access compatibility provided by access controller/application 614A-B based on an SDP record (in the case of Bluetooth and the like). This SDP record may advertise the easy access compatibility. In the case of Wi-Fi, a public action frame may also be used to indicate the easy access compatibility.

When multiple devices are proximate to device 612A, device 612A may send a command that each device present a locally unique pattern, in accordance with some example embodiments. Device 112A may detect the locally unique pattern and thus a specific device from among the devices (for example, by a matching address (such as Bluetooth, Wi-Fi, media access control address) with the specific patterns delivered to each device). This enables device 612A to connect the media (for example, a video/image at device 612B) to a radio level address of device 612B.

In some example embodiments, because device 612A knows when and what exact patterns are used by a given device, such as device 612B, device 612A is able to limit the capture and processing of image frames to detect the pattern at 725 to specific frames. This processing reduction may also facilitate reduced delays and real (or near) time processing at 725.

In some example embodiments, the relative display sizes (for example, size of display 616B) of a device can be estimated based on the size of the image captured and detected at 725, although a device may also provide device description information including display size during the initial discovery or a user may select/provide this information as well.

In some example embodiments, display 616A may present one or more images corresponding to content being presented on devices 612B and the like. When one of those images is selected, device 612A pairs with the selected device 612B, such as a television and/or any other device (using, for example, a push button and/or out-of-band type of approach in both Bluetooth and WiFi/WLAN cases). When this is the case, device 612A may send a command to device 612B to cease presenting the pattern as the device has been detected.

In some example embodiments, device 612A may scan an area to create a virtual map of devices, which can be presented on display 616A at device 612A. This virtual map may show the order in which the different device where detected. The user of device 612A may use this virtual map to select a device (for example, connect to a television and the like) to connect to send different images to different device displays by for example swiping different images, video, and/or other media to each of the virtual screens on his device.

Figure 9:
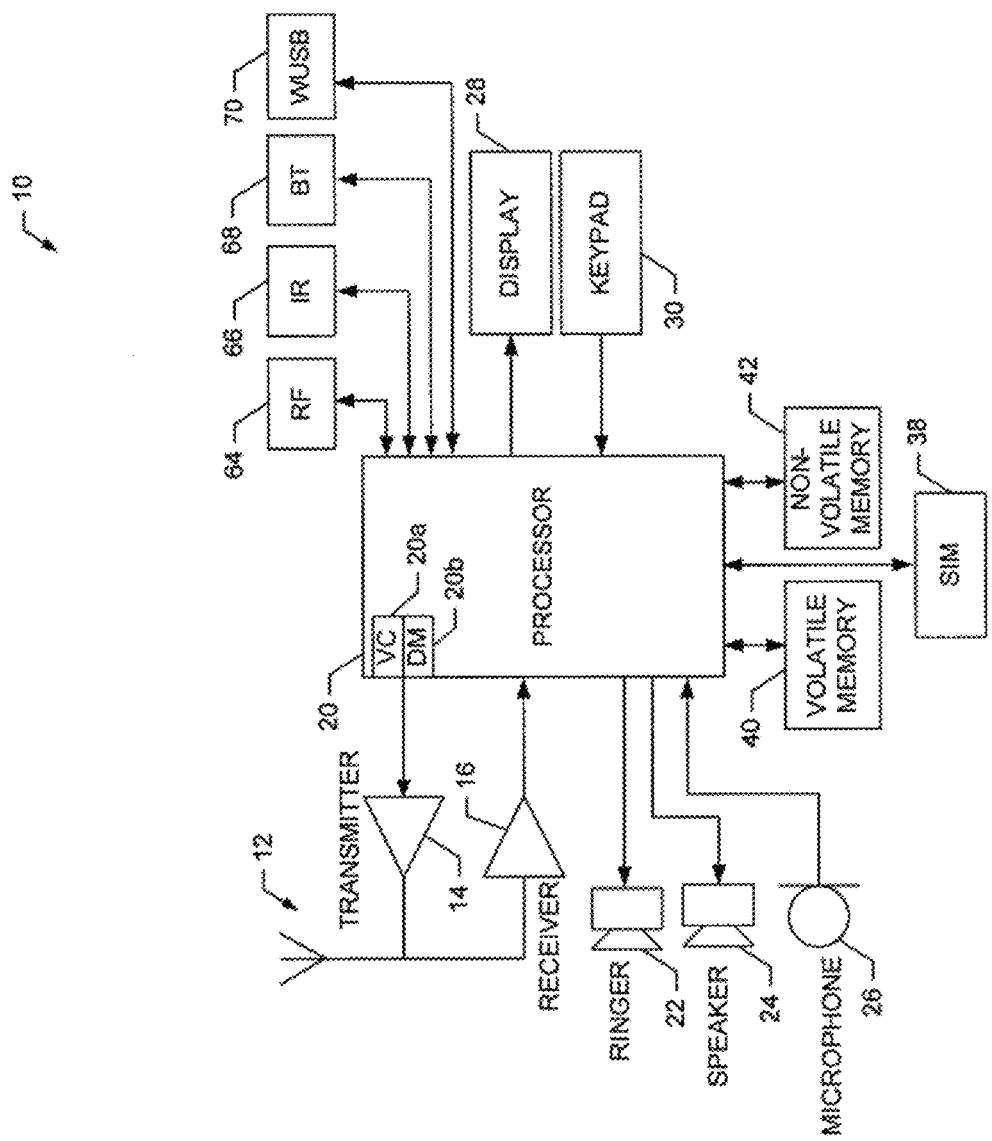
FIG. 9 depicts an example of a wireless user equipment, in accordance with some exemplary embodiments.

FIG. 9 illustrates a block diagram of an apparatus 10, which can be configured as a wireless user equipment, in accordance with some example embodiments. For example, apparatus 10 may be implemented at devices 112A-C and 612A-C. In the case of the device being a television for example, the television may include one or more aspects of apparatus 10. For example, a television may include a radio transceiver, such as a Bluetooth, Bluetooth Low Energy, or Wi-Fi radio transceiver, processor, and the like.

Apparatus 10 may be implemented as a smart phone, mobile station, a mobile unit, a subscriber station, a wireless terminal, a tablet, a wireless plug-in accessory, a television, or any other device with a short-range transceiver, such as Bluetooth, Bluetooth Low Energy, Wi-Fi, and the like.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 9 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 9, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (WUSB) transceiver 70, and/or the like. The Bluetooth transceiver 68 may be capable of operating according to Bluetooth Low Energy technology. In this regard, the apparatus 10 and, in particular, the short-range transceiver may be capable of transmitting data to and/or receiving data from electronic devices within a proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 10. The functions may include one or more of the operations disclosed herein with respect to the user equipment and devices, such as the functions disclosed at process 500 and 700. The memories may comprise an identifier, such as an international mobile equipment identification (IMEI) code, capable of uniquely identifying apparatus 10. In the example embodiment, the processor 20 may be configured using computer code stored at memory 40 and/or 42 to enable processes 500, 700, and/or the like as disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 9. A computer-readable medium may comprise a non-transitory computer-readable storage medium that may be any media that can contain or store the instructions for use by or in connection with an instruction execution system, apparatus, or device, such as a computer. In addition, some of the embodiments disclosed herein include computer programs configured to cause methods as disclosed herein, such as establishing a clock to be shared with at least a second wireless device, sending over a short-range communication link a command to at least the second wireless device, the command indicating an operation to be performed by at least the second wireless device at a time defined by the clock, and the like.

Without in any way limiting the scope, interpretation, or application of the claims appearing below, a technical effect of one or more of the example embodiments disclosed herein is enhanced synchronization between devices coupled via short-range links and/or enhanced coupling and sharing of resources among devices.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method comprising:
   establishing, at a first wireless device, a clock to be shared with at least a second wireless device;
   sending, by the first wireless device over a short-range communication link, a command to at least the second wireless device, the command indicating an operation to be performed by at least the second wireless device at a time defined by the clock, wherein the operation comprises presentation of an image by a display at the second wireless device; and
   detecting, by the first wireless device, the image presented by the display at the second wireless device, the image being presented at the time indicated by the command.

2. The method of claim 1 further comprising:
   selecting, by the first wireless device, the second wireless device for communications, when the first wireless device detects the image presented by the display at the second wireless device.

3. The method of claim 2 further comprising:
   forwarding, by the first wireless device in response to the selecting, data for presentation at the second wireless device.

4. The method of claim 1, wherein the operation comprises playing, at the time, audio content at the second wireless device.

5. The method of claim 4 further comprising:
   determining an audio delay between the first wireless device and the second wireless device by at least determining a difference between the time when the audio is played by the second wireless device and another time when the audio is received by the first wireless device.

6. The method of claim 1, wherein the clock comprises a master clock, and wherein at the first wireless device, the master clock represents a native Bluetooth clock, and at the second wireless device, the master clock represents an estimate of the master clock determined based on an offset added to a clock local to the second wireless device.

7. The method of claim 1, wherein the time defined by the clock represents the time being synchronized to the clock.

8. An apparatus comprising:
   at least one processor circuitry; and
   at least one memory circuitry including computer program code, the at least one memory circuitry and the computer program code configured to, with the at least one processor circuitry, cause the apparatus to perform at least the following:
   establish, at the apparatus, a clock to be shared with at least another wireless device;
   send, by the apparatus over a short-range wireless link, a command to at least the other wireless device, the command indicating an operation to be performed by at least the other wireless device at a time defined by the clock, wherein the operation comprises presentation of an image by a display at the other wireless device; and
   detect, by the apparatus, the image presented by the display at the other wireless device, the image being presented at the time indicated by the command.

9. The apparatus of claim 8, wherein the apparatus is further configured to at least select the other wireless device for communications, when the apparatus detects the image presented by the display at the other wireless device.

10. The apparatus of claim 9, wherein the apparatus is further configured to at least forward, in response to the select, data for presentation at the other wireless device.

11. The apparatus of claim 8, wherein the operation comprises playing, at the time, audio content at the other wireless device.

12. The apparatus of claim 11, wherein the apparatus is further configured to at least determine an audio delay between the apparatus and the other wireless device based on a determined difference between the time when the audio is played by the other wireless device and another time when the audio is received by the apparatus.

13. The apparatus of claim 8, wherein the clock comprises a master clock, and wherein at the apparatus, the master clock represents a native Bluetooth clock, and at the other wireless device, the master clock represents an estimate of the master clock determined based on an offset added to a clock local to the other wireless device.

14. The apparatus of claim 8, wherein the time defined by the clock represents the time being synchronized to the clock.

15. A non-transitory computer-readable storage medium including computer program code, which when executed by at least one processor circuitry causes operations comprising:
   establishing, at a first wireless device, a clock to be shared with at least a second wireless device;
   sending, by the first wireless device over a short-range wireless link, a command to at least the second wireless device, the command indicating an operation to be performed by at least the second wireless device at a time defined by the clock, wherein the operation comprises presentation of an image by a display at the second wireless device; and
   detecting, by the first wireless device, the image presented by the display at the second wireless device, the image being presented at the time indicated by the command.

* * * * *